Feb. 23, 1932.  G. W. MÜLLER  1,846,895
CONTROL SYSTEM
Filed Feb. 27, 1926
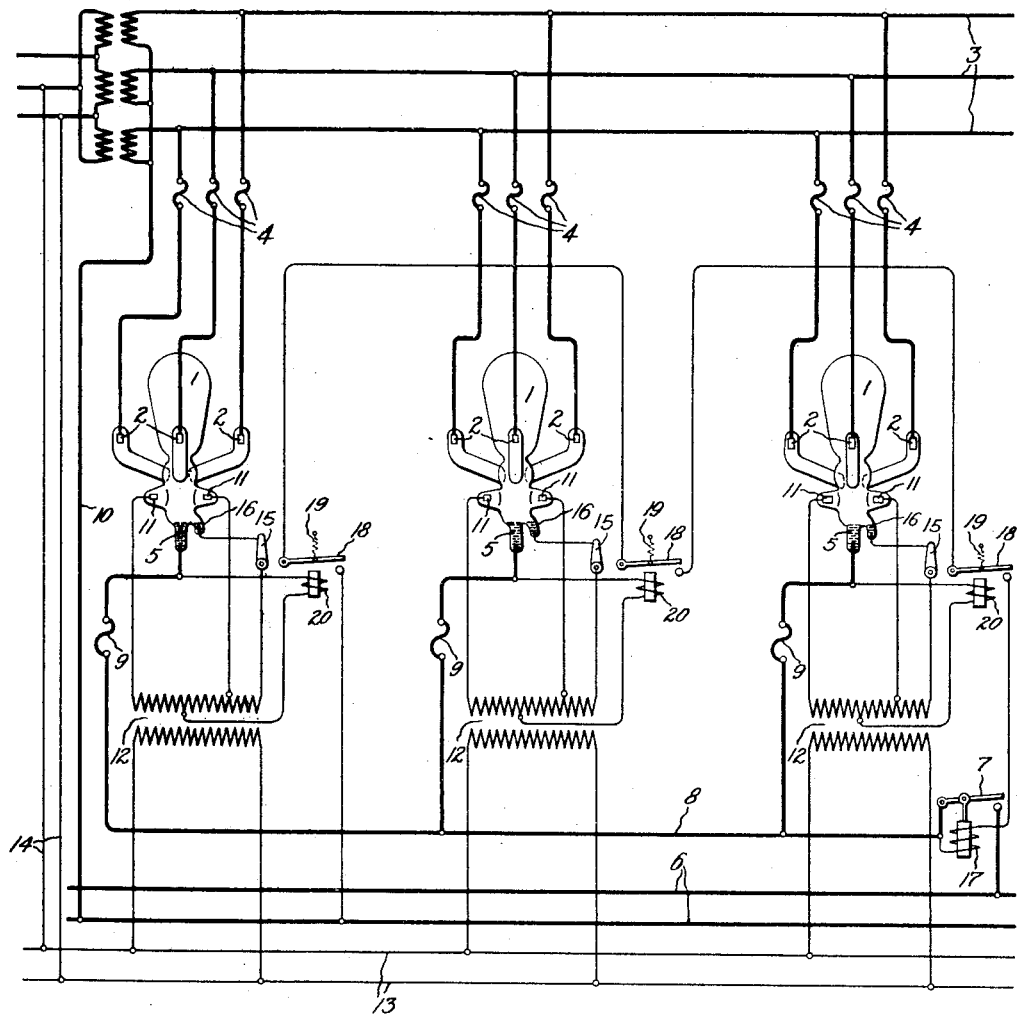
Inventor:
Gustav W Müller,
by Alexander S. Lunt
His Attorney.

Patented Feb. 23, 1932

1,846,895

UNITED STATES PATENT OFFICE

GUSTAV W. MÜLLER, OF CHARLOTTENBURG, GERMANY, ASSIGNOR TO GENERAL ELECTRIC COMPANY, A CORPORATION OF NEW YORK

CONTROL SYSTEM

Application filed February 27, 1926, Serial No. 91,217, and in Germany April 9, 1925.

My invention relates to systems for controlling the operation of mercury arc rectifiers, and has for its principal object the provision of an improved control system that may be utilized to insure the proper division of load between a plurality of rectifiers connected to a distribution circuit in parallel with one another.

When two or more mercury rectifiers connected in parallel to a distribution circuit are put into operation by means of starting arcs, it frequently happens that all the rectifiers do not start to operate at the same instant of time and the rectifiers which do start to operate are subjected to excessive load. In accordance with my invention this difficulty is avoided by the provision of circuit control means which operates to connect the rectifiers to the distribution circuit only when they are all in a condition to assume a share of the load.

My invention will be better understood from the following description when considered in connection with the accompanying drawing and its scope will be pointed out in the appended claims.

The drawing shows a system wherein the connections of a plurality of mercury arc rectifiers are controlled in accordance with my invention.

This system comprises a plurality of mercury arc rectifiers 1 provided with anodes 2 connected to an alternating current circuit 3 through protective devices shown as fuses 4 and with cathodes 5 which are arranged to be connected to one side of a direct current distribution circuit 6 through a switch 7, a conductor 8 and protective devices shown as fuses 9. The other side of the direct current circuit 6 is connected to the neutral lead of the alternating current circuit 3 through a conductor 10. The rectifiers 1 are provided with exciting electrodes 11 connected to the alternating current circuit through transformers 12, alternating current buses 13 and leads 14. Starting switches 15 and electrodes 16 are provided for initiating operation of the rectifiers. Any suitable means, such as impedance devices connected in circuit with the various rectifiers, may be provided for insuring the proper distribution of load between the rectifiers.

The switch 7 is provided with an operating coil 17 arranged to be connected between conductors 8 and 10 through one of the buses 6 and switches 18 which are biased to their open positions by means shown as springs 19 and are provided with operating coils 20, each connected in the exciting circuit of a different one of the rectifiers. It will be apparent that the starting switches 15 may be provided with operating coils arranged to be controlled at a location remote from the rectifiers or the substation in which the rectifiers are located.

Operation of the rectifiers is initiated by closure of the starting switches 15. Upon closure of these switches, arcs are produced at the starting electrodes 16 and these arcs are immediately communicated to the exciting electrodes 11 through which the rectifier excitation is maintained independently of the starting switch. If all the starting switches operate properly and exciting current is supplied to all the rectifiers, the switches 18 are all operated to their closed positions, the switch 7 is closed due to energization of its operating coil 17, and each rectifier assumes its share of the total current transmitted between the alternating current circuit 3 and direct current circuit 6. Should one of the starting switches 15 fail to operate, however, the corresponding switch 18 is maintained in its open position by its spring 19, the control circuit of switch 7 is incomplete, and the connection of the excited and unexcited rectifiers to the direct current distribution circuit is prevented. A proper distribution of the load between the various rectifiers is thus insured.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of a plurality of rectifiers each comprising an anode, a cathode and an exciting electrode, and means connected in series with said exciting electrodes for causing a circuit to be completed between said cathodes and anodes only when all of said rectifiers are excited.

2. The combination of a plurality of rectifiers each comprising an anode, a cathode and an exciting electrode, control devices arranged to be energized in accordance with the exciting currents of said rectifiers, and means controlled by said devices for completing a circuit between said cathodes and anodes.

3. The combination of a plurality of rectifiers each comprising an anode, a cathode and an exciting electrode, a switch comprising an operating coil for completing a circuit between said cathodes and anodes, and a plurality of devices each operated in accordance with the exciting current of a different one of said rectifiers for controlling the energization of said coil.

4. The combination of a distribution circuit, a plurality of rectifiers provided with exciting circuits and arranged to be connected to said distribution circuit in parallel with one another, and means operated in accordance with the currents of said exciting circuits for closing the connections between all of said rectifiers and said distribution circuit at the same instant.

In witness whereof, I have hereunto set my hand this 8th day of February, 1926.

GUSTAV W. MÜLLER.